(12) United States Patent
Melara

(10) Patent No.: US 7,647,673 B2
(45) Date of Patent: Jan. 19, 2010

(54) SELF-ORIENTING CASTER FOR PIECES OF FURNITURE AND THE LIKE

(75) Inventor: Francescantonio Melara, Bologna (IT)

(73) Assignee: Emilsider Meccanica S.p.A., Cadriano DiGranarolo Dell 'Emilia (IT)

( * ) Notice: Subject to any disclaimer, the term of this patent is extended or adjusted under 35 U.S.C. 154(b) by 84 days.

(21) Appl. No.: 10/591,167

(22) PCT Filed: Jan. 28, 2005

(86) PCT No.: PCT/EP2005/000870

§ 371 (c)(1),
(2), (4) Date: Aug. 30, 2006

(87) PCT Pub. No.: WO2005/118314

PCT Pub. Date: Dec. 15, 2005

(65) Prior Publication Data

US 2007/0186373 A1     Aug. 16, 2007

(30) Foreign Application Priority Data

Jun. 1, 2004    (IT) ........................ BO2004A0352

(51) Int. Cl.
*B60B 33/00* (2006.01)
(52) U.S. Cl. ............................. 16/35 R; 16/18 R; 16/45
(58) Field of Classification Search ................ 16/18 R, 16/35 R, 45, 46, 47, 48, 20, 22, 23, 38; 188/1.12; 280/DIG. 1, 47, 297
See application file for complete search history.

(56) References Cited

U.S. PATENT DOCUMENTS 978,161 A     12/1910 Holmes (Continued)

FOREIGN PATENT DOCUMENTS

CH     477 999     10/1969

(Continued)

OTHER PUBLICATIONS

Patent Abstracts of Japan vol. 1996, No. 02, Feb. 29, 1996-& JP 07 257104 A (Chubu Kasei KK), Oct. 9, 1995 abstract; figure 4.

*Primary Examiner*—Victor Batson
*Assistant Examiner*—Jeffrey O'Brien
(74) *Attorney, Agent, or Firm*—Scully, Scott, Murphy & Presser, P.C.

(57) ABSTRACT

A self-orienting caster for pieces of furniture, comprising a pair of wheels, which are supported so that they can rotate about a horizontal axis by a supporting body, which has a cylindrical recess that has a vertical axis and is open upward and axially offset with respect to the horizontal axis, and in which a pivot for the caster is inserted rotatably, the pivot being insertable in a receptacle of the piece of furniture in which the caster is to be fitted, further comprising a through seat formed in the body, a tubular element that is driven through the seat coaxially to the horizontal axis and has two cylindrical tubular portions that lie on opposite sides of the body in order to rotatably support the wheels, devices for the axial and rotational locking of the tubular element in the seat and devices for retaining the wheels on the tubular portions.

14 Claims, 7 Drawing Sheets

U.S. PATENT DOCUMENTS

| | | | | |
|---|---|---|---|---|
| 1,887,436 | A * | 11/1932 | Schacht et al. | 16/45 |
| 4,212,092 | A * | 7/1980 | Ferrari | 16/35 R |
| 4,219,904 | A | 9/1980 | Melara | |
| 4,667,366 | A * | 5/1987 | Melara | 16/47 |
| 4,821,369 | A * | 4/1989 | Daniels | 16/35 R |
| 5,259,088 | A * | 11/1993 | Yang | 16/47 |
| 5,537,715 | A * | 7/1996 | Yang | 16/35 R |
| 5,743,660 | A * | 4/1998 | Hillmann | 384/577 |
| 6,615,448 | B2 * | 9/2003 | Melara | 16/35 R |
| 6,748,623 | B1 * | 6/2004 | Tsai | 16/47 |
| 6,839,939 | B2 * | 1/2005 | Donakowski | 16/45 |
| 2002/0178539 | A1 | 12/2002 | Donakowski | |
| 2005/0081329 | A1 * | 4/2005 | Tsai | 16/18 R |

FOREIGN PATENT DOCUMENTS

| | | |
|---|---|---|
| DE | 101 28 099 A1 | 12/2002 |
| EP | 1 110 757 A | 6/2001 |
| EP | 1 110 757 A2 | 6/2001 |
| GB | 967915 | 8/1964 |
| JP | 7-257104 | 10/1995 |
| WO | WO 03/101764 A | 12/2003 |
| WO | WO 03/101764 A2 | 12/2003 |

* cited by examiner

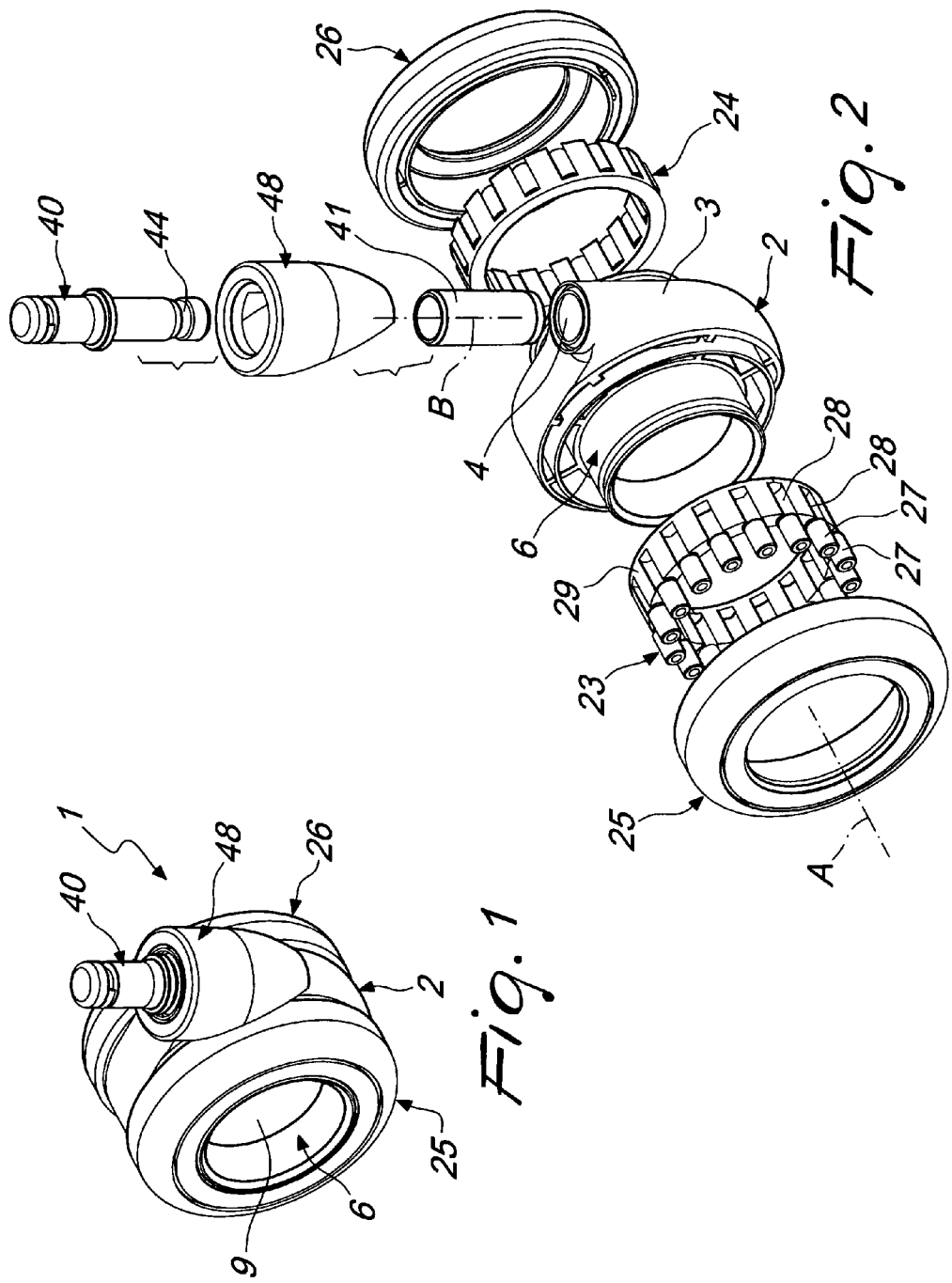

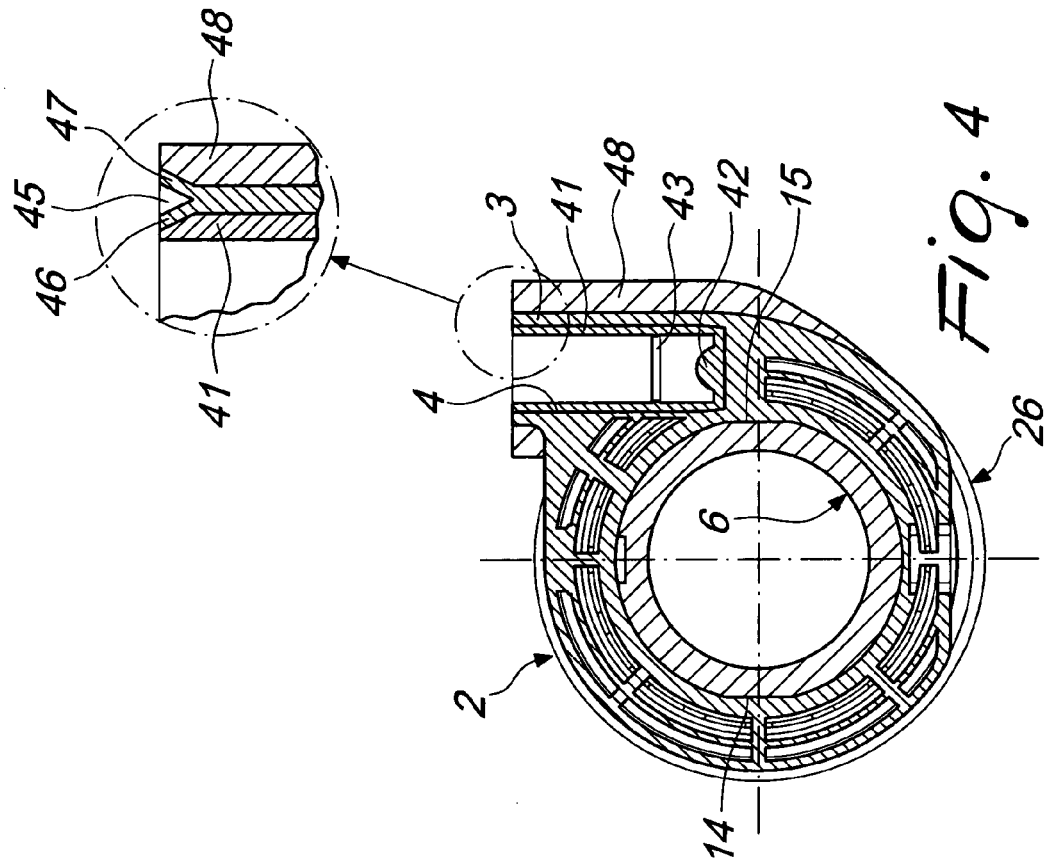
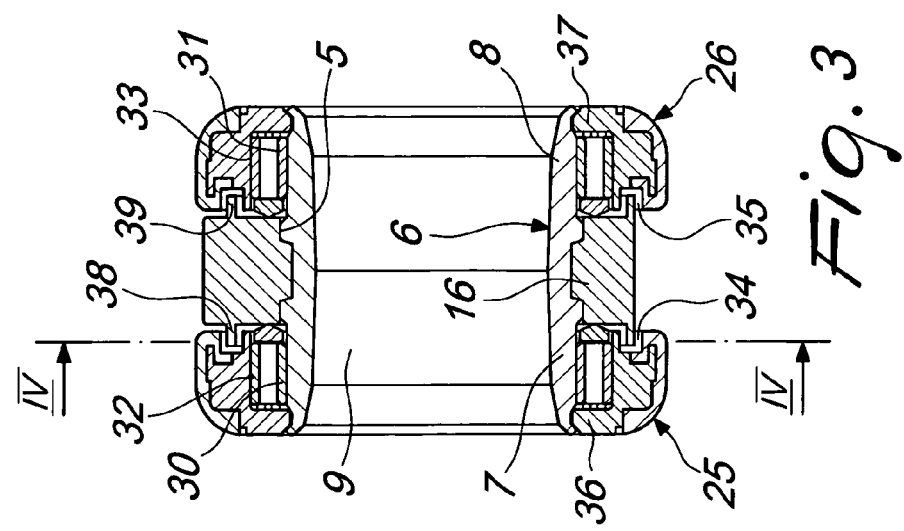

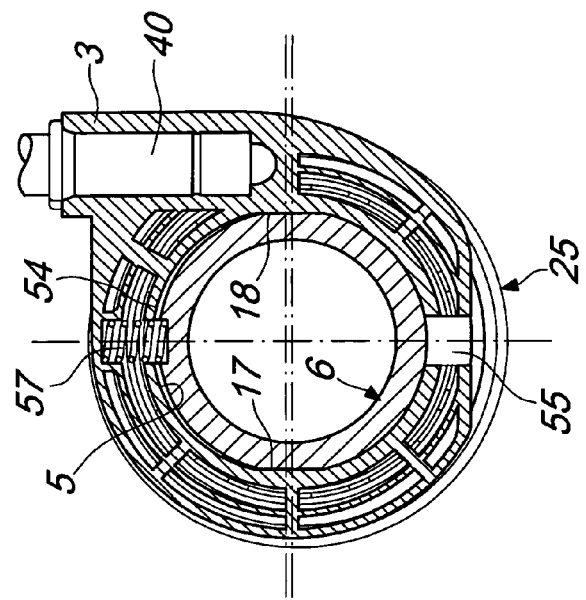
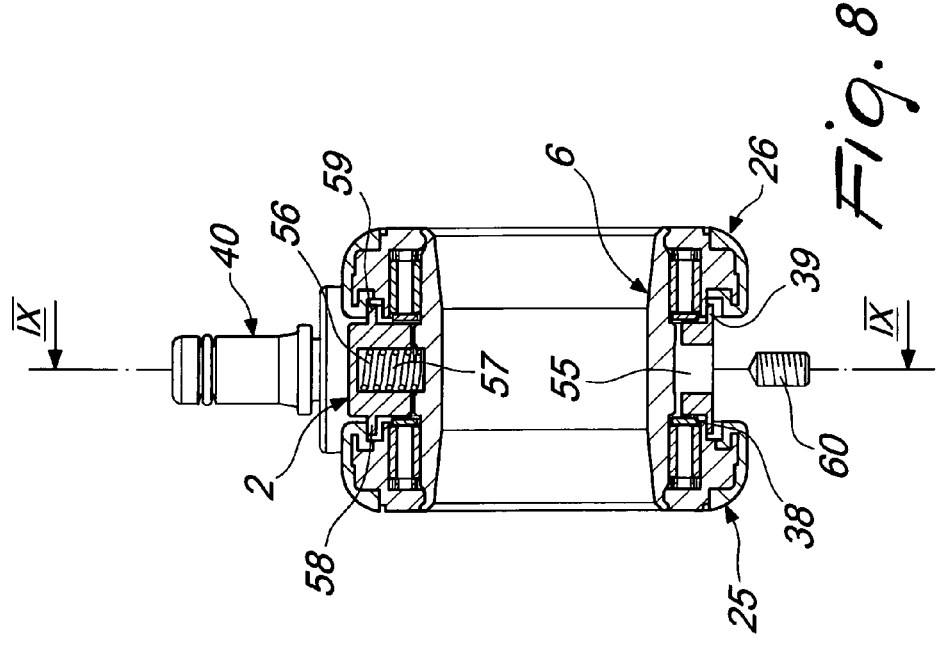

SELF-ORIENTING CASTER FOR PIECES OF FURNITURE AND THE LIKE

The present invention relates to a self-orienting caster for pieces of furniture and the like.

BACKGROUND OF THE INVENTION

Self-orienting casters are known, particularly of the so-called twin type, which are constituted by two wheels that are mounted so they can rotate about a horizontal shaft. The shaft is supported in a seat formed in a supporting structure that is arranged between the wheels.

In the supporting structure there is a vertical cylindrical recess, which is open upward, is axially offset with respect to the shaft, and acts as a rotation seat for a vertical pivot for the spontaneous orientation (pivoting) of the wheel, which is intended to be inserted and retained in a receptacle of the piece of furniture on which the caster is to be fitted.

Self-orienting casters are also known in which the wheels can rotate about a tubular shaft that protrudes on opposite sides of the central supporting structure. Casters of this type, also known as hubless casters, are disclosed in U.S. Pat. No. 978,161, in US publication 2002/01758539, in British patent 967,915, and in German publication 101 28 099. Swiss patent 477,999, British patent 967,915 and US publication 2002/1178539 describe solutions in which the wheels and the tubular shaft are provided with mutually opposite tracks for the rolling of balls or rollers for rotatably supporting the wheels. Known casters have drawbacks as regards the structure composed of the central support and the tubular shaft, which is unable to combine satisfactorily mechanical strength characteristics, in order to be able to withstand the loads, with the need to obtain a product which, as it is intended for pieces of furniture (chairs, tables, etc.), must meet appreciable aesthetic requirements.

SUMMARY OF THE INVENTION

The aim of the present invention is to provide a contribution in this regard, by providing a caster that is capable of meeting these requirements, is easy and cheap to manufacture and assemble, and offers new aesthetic standards.

Within this aim, an object of the present invention is to provide a caster having a structure suitable to ensure very smooth rolling on surfaces of any kind.

Another object of the present invention is to provide a caster that can be provided with a braking device that can be neutralized when necessary.

This aim and these and other objects that will become better apparent hereinafter are achieved with a self-orienting caster for pieces of furniture and the like, the characteristics of which are defined in the appended claims.

BRIEF DESCRIPTION OF THE DRAWINGS

Further characteristics and advantages will become better apparent from the following detailed description of some preferred but not exclusive embodiments of the caster according to the invention, illustrated by way of non-limiting example in the accompanying drawings, wherein:

FIG. 1 is a perspective view of a self-orienting twin caster according to a first embodiment;

FIG. 2 is an exploded view of the caster of FIG. 1;

FIG. 3 is a sectional view of the caster of FIG. 1, taken along a vertical plane that passes through the horizontal rolling axis;

FIG. 4 is a sectional view of the caster of FIG. 1, taken along the line IV-IV of FIG. 3, and also shows a detail in enlarged scale;

FIG. 8 is a sectional view, taken along a vertical plane, of the caster of FIG. 7;

FIG. 9 is a sectional view, taken along the line IX-IX of FIG. 8;

DESCRIPTION OF THE PREFERRED EMBODIMENTS

Figure 5:
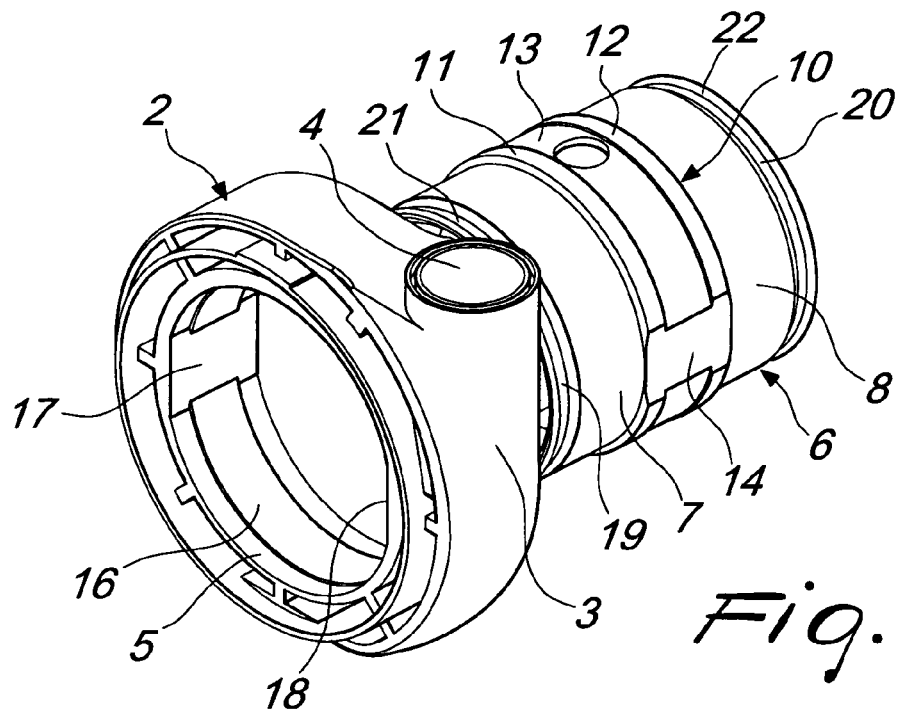
FIG. 5 is a perspective view of parts of the caster shown in FIG. 2.

With reference to FIGS. 1-4, the reference numeral 1 generally designates a self-orienting caster of the so-called twin type, particularly for pieces of furniture. The caster comprises a body 2 that has a substantially ring-like structure reinforced by radial ridges. The body 2 is provided with a peripheral expansion 3 in which there is a cylindrical recess 4, which is tangent to the body 2.

The body 2 is provided with a through seat 5 that has a circular cross-section and through which a tubular element or sleeve 6 is arranged; such element comprises two cylindrical portions 7, 8, which protrude coaxially in a cantilever fashion from opposite sides of the body 2. The portions 7, 8 are aligned along a horizontal axis A, which is axially offset and perpendicular with respect to the vertical axis B of the recess 4, and enclose a cylindrical cavity 9, which passes through the body 2.

The sleeve 6 is provided with a collar 10 (FIG. 5), which lies around the central region and is composed of two annular ridges 11, 12, between which a channel 13 is formed. The ridges 11, 12, in diametrically opposite positions, are rounded and form two flat surfaces 14, 15, which are tangent to the cylindrical surface of the sleeve 6. An annular ridge 16 and two diametrically opposite flat surfaces 17, 18, arranged on planes that are parallel to the axis B, are provided within the seat 5 of the body 2. The diameters of the seat 5 and of the ridges 11, 12, as well as the dimensions of the flat surfaces 17, 18 and the width of the channel 13 and of the annular protrusion 16 are chosen so as to allow the sleeve 6 to be inserted by forcing in the seat 5, thus providing an axial connection of the sleeve 6 to the body 2 by way of the engagement of the annular protrusion 16 in the channel 13. At the same time, rotary locking is provided by side-fit engagement between the flat regions 14, 15 and 17, 18.

The forcing action can be facilitated by acting on the configuration of the annular ridges 11, 12 and by resorting to a suitable choice of the materials for the sleeve 6 and the body 2. Advantageously, the sleeve 6 is made of plastic material, whereas for the body 2 it is possible to use plastic material and metal, for example a metallic alloy of zinc, aluminum and magnesium, known by the tradename ZAMA, depending on the load stresses to which the caster is subjected.

Respective annular slots 19, 20 are formed in the tubular portions 7, 8, proximate to their free ends, and form respective annular lips 21, 22, which are folded outward.

Two wheels 25, 26 are fitted rotatably on the tubular portions 7,8 (FIG. 3) by way of the interposition of bearings 23, 24. The bearings 23, 24 are of the rolling type and are constituted by rollers 27 inserted in receptacles 28 of an annular cage 29. The rollers 27 have a diameter that is larger than the radial thickness of the cage 29, so that they protrude toward the inside and the outside of the receptacles 28 and can roll on the opposite cylindrical tracks 30, 31 of the tubular portions 7, 8 and respectively 32, 33 of the wheels 25, 26.

The wheels 25, 26 have, on the side that faces the body 2, respective grooves 34, 35 and, on the opposite side, respective internal collars 36, 37. The internal collars 36, 37 are sized so as to engage by elastic forcing in the slots 19, 20 of the sleeve 6 and therefore retain axially thereon the wheels 25, 26 with minimal friction. At the same time, two annular ridges 38, 39 engage in the grooves 34, 35, protrude frontally from the lateral faces of the body 2 and surround the seat 5, forming a sort of labyrinth-like coupling that prevents foreign particles and dirt from penetrating toward the bearings 23, 24 and compromising their correct operation.

The caster is fitted to the piece of furniture by means of a pivot 40, which can rotate in a bush 41 (FIGS. 2 and 4), which acts as an antifriction bearing for the rotation of the caster about the pivot 40. The bush 41 is shaped like a bushing that has a stud 42 that protrudes from the bottom and an internal collar 43. The stud 42 acts as a resting point for the pivot 40 on the caster 1, while the internal collar 43 is used to retain the pivot 40 within the bushing 41 after it has been forced to engage in an annular groove 44 of said pivot.

In order to retain the bush 41 in the recess 4, the inlet of the recess is formed by a protruding rim, which has a groove 45 that divides it into two mutually concentric lips 46, 47. The inner annular lip 46 is suitable to be folded onto the rim of the bush 41, so as to lock it axially in the recess. Advantageously, the outer rim of the bush 41 is rounded in order to allow the internal lip 46 to be folded over onto it and ensure more effective axial retention of the bush. Likewise, the outer annular lip 47 is folded outward so as to lock any optional ring-like element 48 that is applied so as to cover the expansion 3 and is shaped so as to mate with the contour of the body 2.

During use, the described caster 1 behaves like a known twin caster, but with the considerable advantage that the sleeve 6, by way of its radial dimensions, provides the caster with the rigidity required to withstand effectively load imbalances on the two wheels and facilitate their smooth rotation. Further, the hollow structure of the sleeve 6 does not encumber, also from an aesthetic standpoint, the caster, whose appearance maintains the requirements of lightness even in the case of large casters.

Figure 6:
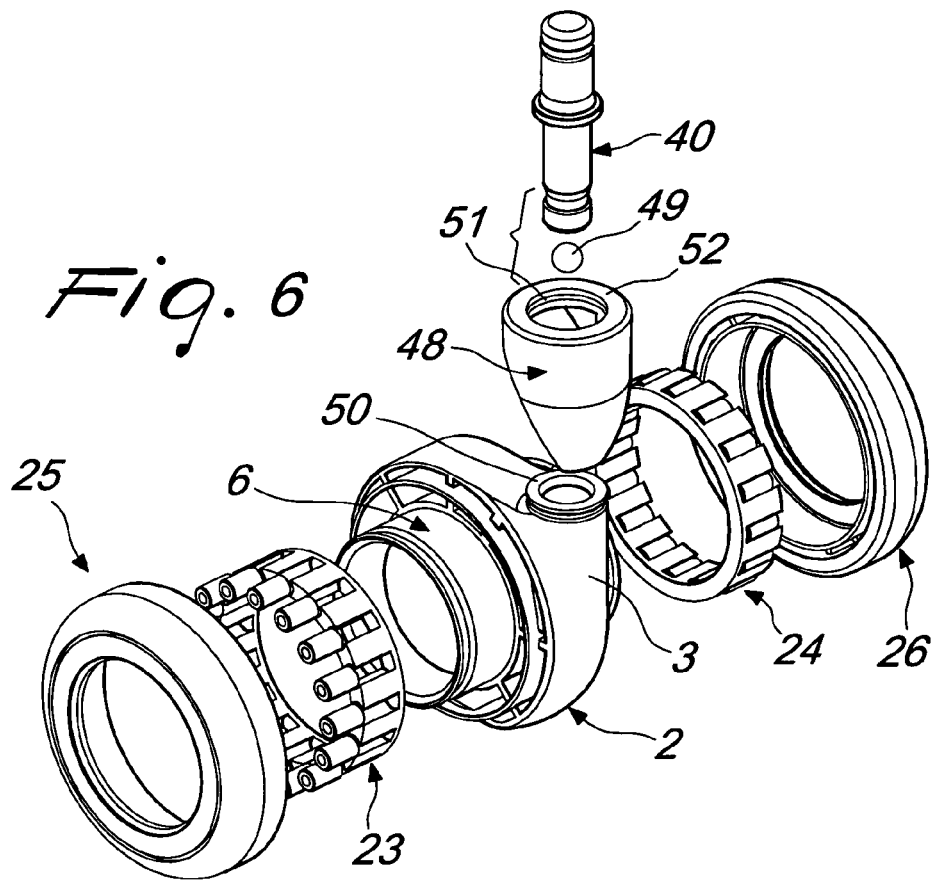
FIG. 6 is an exploded view of a self-orienting twin caster according to a second embodiment.
Figure 7:
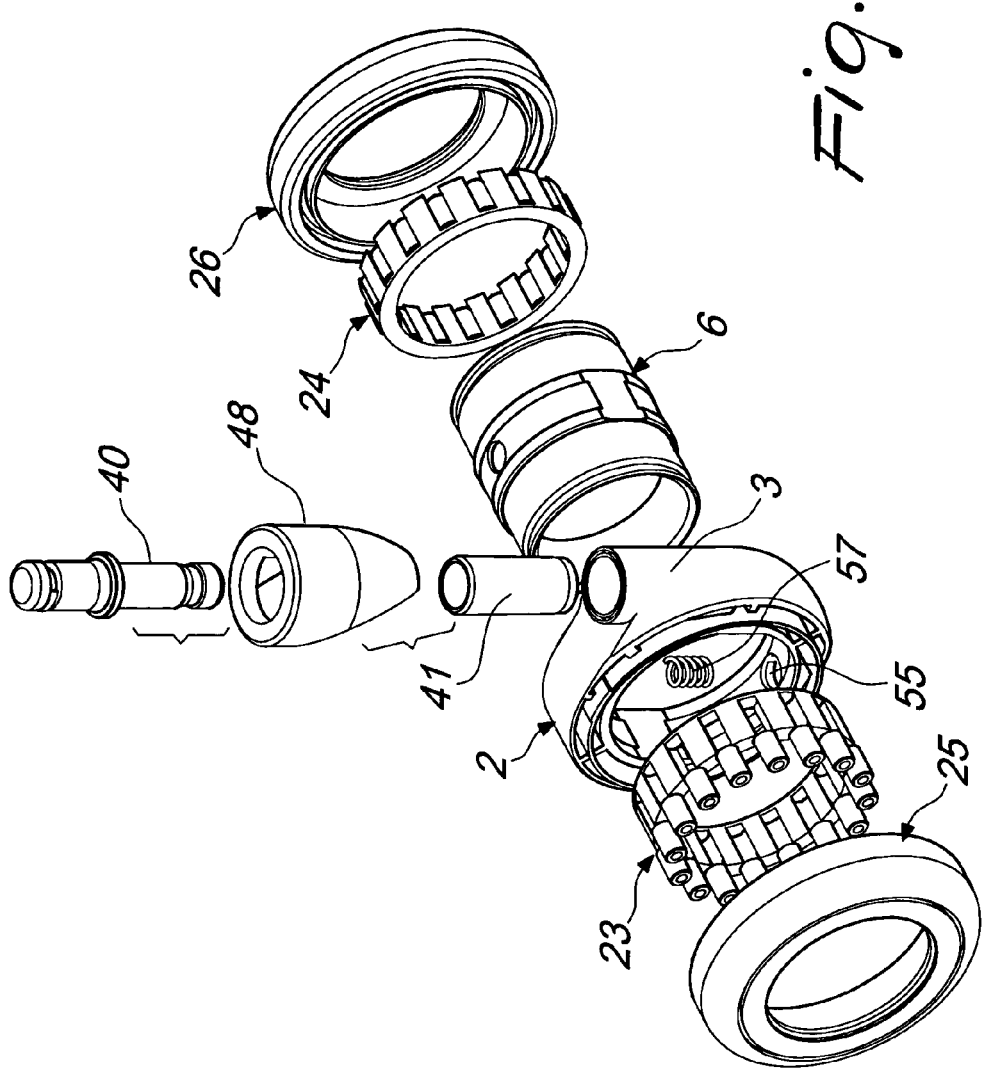
FIG. 7 is an exploded view of a self-orienting twin caster according to a third embodiment in which there is a self-braking device.
Figure 10:
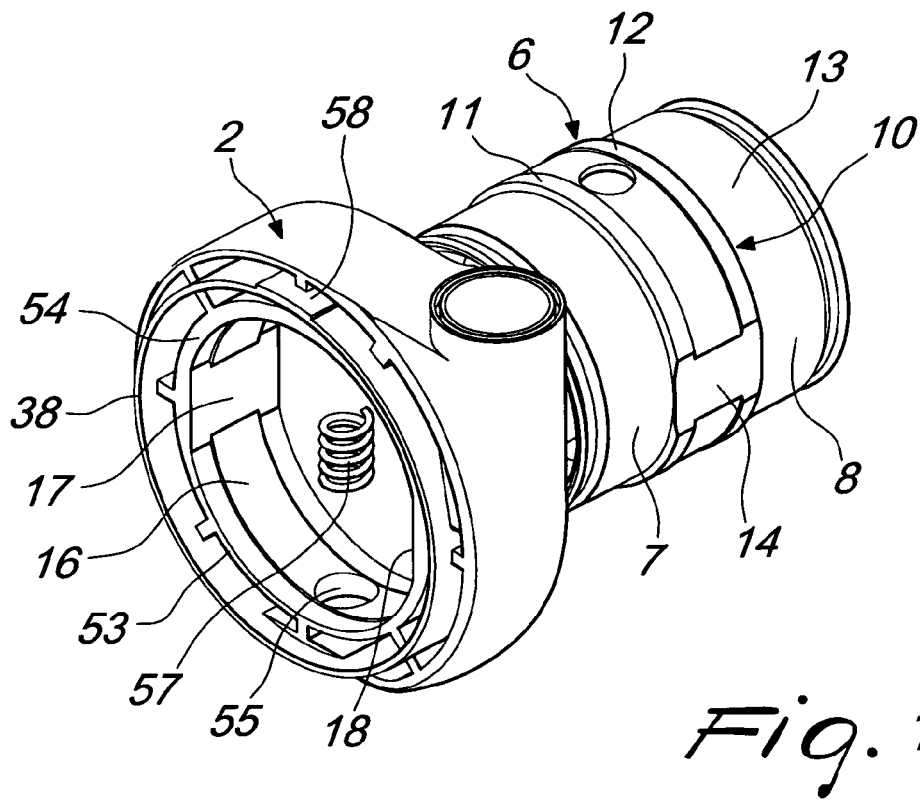
FIG. 10 is a view of parts of the caster of FIG. 7.

It should be noted that the bush 41 may be omitted. In this embodiment, shown in FIG. 6, the pivot 40 of the caster 1 rests directly on the bottom of the recess 4 with the interposition of a ball 49. The covering element 48 is locked by providing, around the rim of the inlet of the recess 4, an annular lip 50 suitable to engage in a groove 51 formed inside the ring 52 of the element 48.

FIGS. 7, 8, 9 and 10 illustrate another embodiment, which relates to a twin caster provided with a self-braking device that ensures wheel locking when the caster is not loaded, for example as required by safety standards if the caster is used in office chairs.

In the caster of FIGS. 7-10, the seat 5 is formed by two substantially semicylindrical portions 53, 54, which have a radius that is equal to the radius of the portions 7,8 of the sleeve 6 but are mutually spaced so that the seat 5 is ovalized. The adjacent ends of the portions 53, 54 are connected by the two opposite flat surfaces 17, 18, which as mentioned have a mutual distance that is equal to the distance between the flat surfaces 14, 15 of the sleeve 6. The ridges 38, 39 also are constituted by semicylindrical portions that are concentric with respect to the respective portions 53, 54. The ovalization of the seat 5 allows to insert therein the sleeve 6 so that the flat surfaces 14, 15 are in sliding contact with the flat surfaces 17, 18 of the body 2, allowing the sleeve 6 to perform vertical movements within the seat 5 while remaining rotationally coupled to the body 2 and being retained axially by the engagement of the annular protrusion 16 in the channel 13.

A through hole 5 is provided centrally through the lower semicylindrical portion 53 and is aligned vertically with a blind seat 56 formed in the upper semicylindrical portion 54. A spring 57 is inserted in the blind seat 56, before the sleeve 6 is positioned in the seat 5, and acts on said sleeve, when said sleeve is inserted, so as to push it towards the lower portion 53.

The spring 57, once the caster 1 has been fitted to the chair, allows the body 2 to move with respect to the sleeve 42. In particular, the spring 57 is sized as so as to lift the body 2 with respect to the sleeve 6 when the caster is not loaded and instead allow its lowering when the caster 1 is loaded. In the first manner of use (for example, when the caster 1 is mounted on an office chair on which no one is sitting), locking of the caster is provided by way of the friction effect obtained by means of the contact of sliding blocks 58, 59, which are constituted by protrusions formed above the top of the ridges 38, 39, against the walls of the grooves 34, 35 of the wheels 25, 26 in which the ridges 38, 39 are engaged. In the second manner of use, i.e., when the caster is loaded (for example when a person is sitting on the chair), the ridges 38, 39 are perfectly free in the grooves 34, 35, allowing the free gliding of the chair.

The spring 57 may also act as a shock absorber. In this case, the sliding blocks 58, 59 are omitted in order to avoid a braking effect.

The caster of FIGS. 7-10 can be modified easily in order to make it able to glide freely or glide with friction when necessary. For this purpose, the lower through hole 55 is threaded in order to receive an adjustment screw 60, which is suitable to act on the sleeve 6. Actuation of the screw 60 allows the sleeve 6 to be raised so as to move the sliding blocks 58 of the ridges 38, 39 into friction-controlled or free engagement against the walls of the grooves 34, 35.

Figure 11:
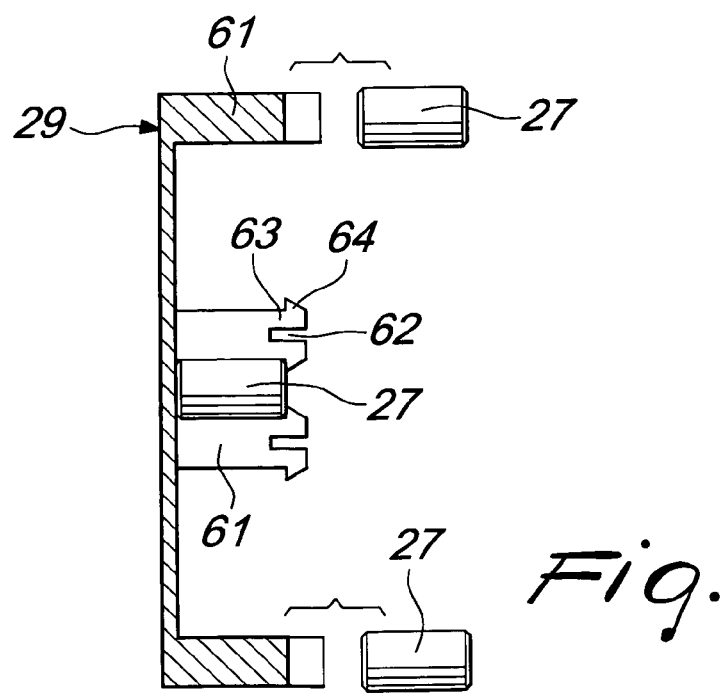
FIG. 11 is a partially sectional perspective view of a different embodiment of the wheel supporting bearing.

In the embodiment shown in FIG. 11, the partitions 61 of the bearings 23, 24 that mutually separate the receptacles of the rollers 27 have ends that are divided by respective radial slits 62, which form two flexible prongs 63. The prongs 63 are provided with teeth 64, which narrow the access of the rollers 27 in the receptacles 28. The prongs 63, by way of their flexibility, allow the insertion of the rollers in the receptacles and their retention by means of the teeth 64.

Figure 12:
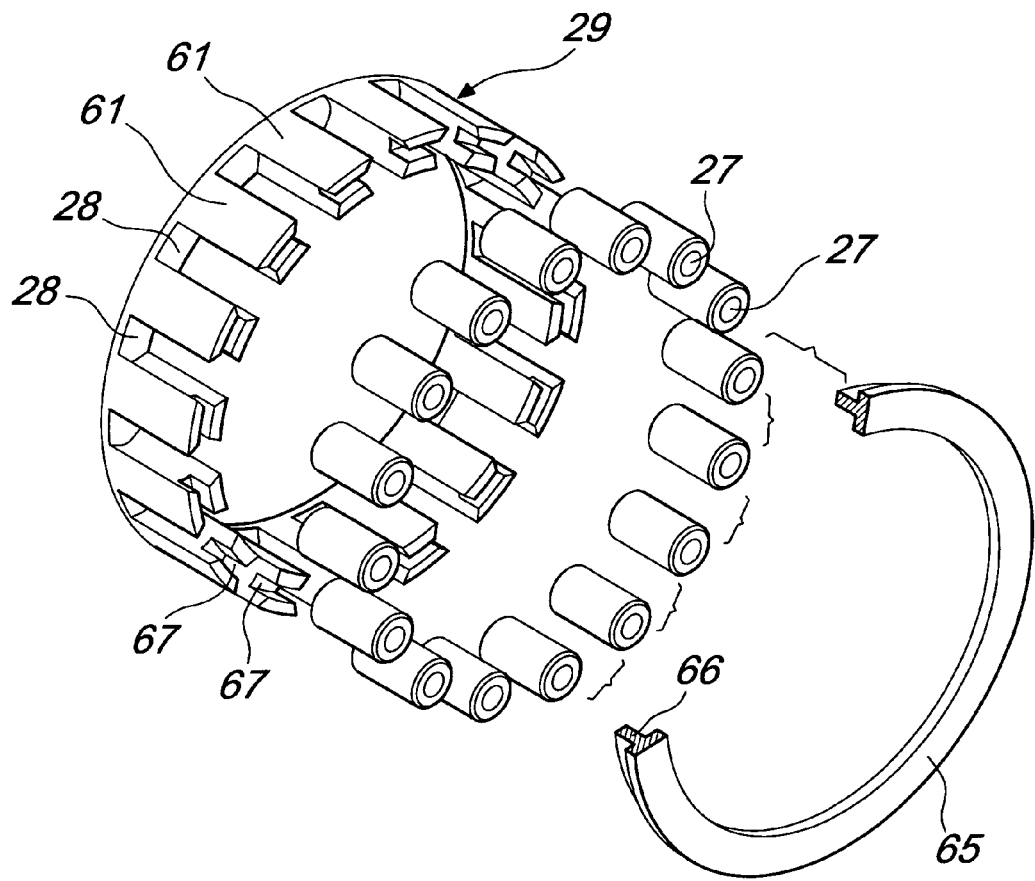
FIG. 12 is a sectional view of a bearing according to another embodiment.

In the embodiment shown in FIG. 12, roller retention is provided by providing a ring 65, which is associated with the cage 29 by means of an annular flange 66 that protrudes from one of its faces and engages slits 67 formed in the ends of the partitions 61.

In another embodiment, a metal strip is applied, is connected to the metal body 2 and is in sliding contact with the rolling surface of the casters in order to discharge any electrostatic charges to the ground.

The disclosures in Italian Patent Application No. BO2004A000352 from which this application claims priority are incorporated herein by reference.

The invention claimed is:

1. A self-orienting caster for pieces of furniture, comprising: a supporting body; a pair of wheels, which are supported by said supporting body for rotation about a horizontal axis; a cylindrical recess provided in said supporting body and being open upward and having a vertical axis, said cylindrical recess being axially offset with respect to said horizontal axis; a pivot for the caster inserted rotatably in said cylindrical recess, said pivot being further insertable at a free end thereof in a receptacle of the piece of furniture in which the caster is to be fitted; a through seat formed in said supporting body; a tubular element that is driven through said seat coaxially to said horizontal axis, said tubular element having two cylindrical tubular portions that lie on opposite sides of said body in order to rotatably support said wheels; means for retaining said wheels on said tubular portion; means for axially and rotatably locking said tubular element in said seat that comprise two annular ridges of said tubular element provided so as to surround said tubular element, and an annular protrusion formed on said seat and suitable to engage said ridges upon forced insertion of said tubular element into said seat so as to axially horizontally retain said tubular element in said seat, and wherein said annular protrusion of said seat has two flat surfaces, which are suitable to engage respective flat surfaces of said tubular element in order to prevent rotation of said tubular element in said seat and to guide vertical movement of said tubular element; and elastic means interposed between said tubular element and said body so as to act for raising said body with respect to said tubular element.

2. The caster of claim 1, wherein said means for retaining said wheels are constituted by annular slots, which are formed at the free ends of said tubular portions and form respective annular lips, and by collars, which are formed in said wheels and engage in said slots so that they are retained by said collars and retain said wheels on said tubular portions.

3. The caster of claim 1, wherein said two annular ridges, which surround said tubular element form a channel between them, said annular protrusion, which is formed in said seat being engageable by forcing in said channel.

4. The caster of claim 1, wherein annular ridges protrude from opposite sides of said supporting body and surround coaxially said tubular portions, and said wheels, on the side directed toward said body, are provided with annular grooves that are suitable to receive said ridges.

5. The caster of claim 1, wherein said tubular portions form respective rolling tracks for rolling elements of bearings in order to rotatably support said wheels.

6. The caster of claim 1, wherein said seat is formed by two semicylindrical portions that are vertically spaced with respect to each other so that the seat has an oval shape in a direction parallel to said vertical axis, said flat surfaces orientated in said direction parallel to said vertical axis.

7. The caster of claim 6, wherein the elastic means is interposed between said tubular element and said body and is sized so as to keep said body raised with respect to said tubular element in a position for braking the wheels, at which said ridges are in friction contact with the walls of said grooves when the caster is not loaded, and keep said body lowered with respect to said tubular element in a position in which the wheels are released and at which said ridges are free to slide in said grooves when the caster is loaded.

8. The caster of claim 7, wherein said elastic means are constituted by a spring, which is accommodated in a seat of said body that is open toward said seat and lies above said tubular element and acts thereon.

9. The caster of claim 8, wherein a hole is formed in said body, in a diametrically opposite position with respect to said seat of the spring, and is suitable to receive a screw that acts on said tubular element in order to lift it into the position for releasing said wheels.

10. The caster of claim 5, wherein said supporting bearings are constituted by an annular cage, which is provided with a plurality of receptacles for said rolling elements formed by axial partitions, means being provided for retaining said rolling elements in said receptacles.

11. The caster of claim 10, wherein said retention means are constituted by teeth, which protrude from said partitions into said receptacles.

12. The caster of claim 10, wherein said retention means are constituted by a ring, which is associated with said cage by means of an annular flange that protrudes from one of its faces and engages in slits formed in the ends of said partitions.

13. The caster of claim 1, wherein said pivot can rotate in a bush that is inserted in said recess and is retained axially by an annular lip, which is formed on the rim of said recess and is folded onto said bush.

14. The caster of claim 1, comprising an element for covering said body that is shaped so as to mate with its contour, said element being locked on said body by an annular lip formed on the rim of said recess.

* * * * *